(12) United States Patent
Kåberg Johard

(10) Patent No.: US 12,105,836 B2
(45) Date of Patent: Oct. 1, 2024

(54) SYSTEM AND METHOD FOR HANDLING ANONYMOUS BIOMETRIC AND/OR BEHAVIORAL DATA

(71) Applicant: Indivd AB, Sundsvall (SE)

(72) Inventor: Leonard Kåberg Johard, Kazan (RU)

(73) Assignee: Indivd AB, Sundsvall (SE)

( * ) Notice: Subject to any disclaimer, the term of this patent is extended or adjusted under 35 U.S.C. 154(b) by 804 days.

(21) Appl. No.: 17/250,802

(22) PCT Filed: Aug. 22, 2019

(86) PCT No.: PCT/SE2019/050769
§ 371 (c)(1),
(2) Date: Mar. 4, 2021

(87) PCT Pub. No.: WO2020/050760
PCT Pub. Date: Mar. 12, 2020

(65) Prior Publication Data
US 2021/0319134 A1     Oct. 14, 2021

(30) Foreign Application Priority Data
Sep. 7, 2018  (SE) .................... 1851062-8

(51) Int. Cl.
G06F 21/62      (2013.01)
G06F 21/32      (2013.01)
(Continued)

(52) U.S. Cl.
CPC ..... *G06F 21/6245* (2013.01); *G06Q 30/0201* (2013.01); *G06V 40/173* (2022.01);
(Continued)

(58) Field of Classification Search
CPC ... G06F 21/6245; G06F 21/32; G06V 40/173; G06V 40/20; G06V 40/50; G06V 20/52;
(Continued)

(56) References Cited

U.S. PATENT DOCUMENTS

| | | |
|---|---|---|
| 9,020,208 B2 | 4/2015 | Whillock et al. |
| 9,031,857 B2 | 5/2015 | Angell et al. |
| | (Continued) | |

FOREIGN PATENT DOCUMENTS

| | | |
|---|---|---|
| EP | 2725538 A1 | 4/2014 |
| RU | 2439697 C2 | 1/2012 |

OTHER PUBLICATIONS

European Search Report for Application No. 19857877.5, mailed on Apr. 20, 2022, 9 pages.
(Continued)

*Primary Examiner* — Jung W Kim
*Assistant Examiner* — Alan Lingqian Kong
(74) *Attorney, Agent, or Firm* — Brake Hughes Bellermann LLP

(57) ABSTRACT

There is provided a method and corresponding system for handling and/or generating anonymous biometric and/or behavioural data. The method comprises the steps of mapping (S1) biometric data originating from a subject into a biometric key using a one-way locality-sensitive hash function or receiving the biometric key. The method also comprises storing (S2) additional anonymous behavioural data bound to this key into an existing biometric trajectory in a database, wherein the behavioural data describes the user behavior of the subject. The method is performed to anonymize biometric data from a multitude of individuals, or subjects, per key, where each biometric key maps to biometric data of several subjects, and such a set of subjects resulting in the same biometric key is called a hash group, and a biometric trajectory is developed for each hash group.

14 Claims, 10 Drawing Sheets

(51) Int. Cl.
  *G06Q 30/0201* (2023.01)
  *G06V 20/52* (2022.01)
  *G06V 40/16* (2022.01)
  *G06V 40/20* (2022.01)
  *G06V 40/50* (2022.01)
  *H04L 9/06* (2006.01)

(52) U.S. Cl.
  CPC .............. *G06V 40/20* (2022.01); *G06V 40/50* (2022.01); *H04L 9/0643* (2013.01); *G06F 21/32* (2013.01); *G06V 20/52* (2022.01); *G06V 40/53* (2022.01)

(58) Field of Classification Search
  CPC ... G06V 40/53; G06Q 30/0201; H04L 9/0643
  See application file for complete search history.

(56) References Cited

U.S. PATENT DOCUMENTS

| | | | |
|---|---|---|---|
| 9,031,858 B2 | 5/2015 | Angell et al. | |
| 9,092,808 B2 | 7/2015 | Angell et al. | |
| 9,361,623 B2 | 6/2016 | Angell et al. | |
| 9,501,618 B1 | 11/2016 | Wurst | |
| 9,894,063 B2 | 2/2018 | Connell et al. | |
| 10,956,604 B2* | 3/2021 | Shchur ................... | G06V 20/52 |
| 2002/0174218 A1* | 11/2002 | Dick ........................ | G06F 9/542 |
| | | | 709/224 |
| 2004/0158724 A1 | 8/2004 | Carr et al. | |
| 2008/0249838 A1 | 10/2008 | Angell et al. | |
| 2009/0231096 A1 | 9/2009 | Bringer et al. | |
| 2013/0195316 A1 | 8/2013 | Bataller et al. | |
| 2014/0063237 A1 | 3/2014 | Stone et al. | |
| 2014/0122248 A1 | 5/2014 | Kuzama et al. | |
| 2014/0359722 A1 | 12/2014 | Schultz et al. | |
| 2015/0006243 A1 | 1/2015 | Yuasa | |
| 2015/0039902 A1 | 2/2015 | Arya et al. | |
| 2015/0135329 A1* | 5/2015 | Aghasaryan ........ | H04L 63/0421 |
| | | | 726/26 |
| 2015/0156172 A1* | 6/2015 | Nandi ................. | H04L 63/0471 |
| | | | 713/153 |
| 2016/0371547 A1 | 12/2016 | Valentino et al. | |
| 2017/0169470 A1* | 6/2017 | Deluca ................... | H04W 4/12 |
| 2017/0302661 A1 | 10/2017 | Connell et al. | |
| 2018/0232536 A1 | 8/2018 | Fineman et al. | |
| 2020/0052906 A1* | 2/2020 | Cahill .................... | H04L 9/3231 |
| 2022/0092217 A1* | 3/2022 | Kato ...................... | H04N 5/913 |

OTHER PUBLICATIONS

First Examination Report for India Application No. 202127015661, mailed on Mar. 7, 2022, 6 pages.
International Search Report and Written Opinion issued in PCT Appln. No. PCT/SE2019/050769, mailed on Oct. 23, 2019, 10 pages.
Swedish Search Report for Patent Application No. 1851062-8, mailed on Mar. 29, 2019, 3 pages.
Lazrig et al., "Privacy Preserving Probabilistic Record Linkage Using Locality Sensitive Hashes", Proc. Int. Conf. Adv. Biometrics (ICB); Lecture notes in Computer Science; lect. Notes Computer], Springer, Berlin, Heidelberg, vol. 9766, Chap. 5, No. 558;, Jul. 2, 2016, pp. 61-76.
Li et al., "Preservation of Location Information Based On Minhash Algorithm in Online Ride-Hailing Services", 2018 Sixth International Conference on Advanced Cloud and Big Data (CBD, IEEE;, Aug. 12, 2018, pp. 257-262.
Vu et al., "Efficient Algorithms for K-Anonymous Location Privacy in Participatory Sensing", INFOCOM, 2012 Proceedings IEEE, Mar. 25, 2012, pp. 2399-2407.
Russian Search Report for Application No. 2021109086/28(019636), mailed on Feb. 9, 2023, 2 pages.

* cited by examiner

SYSTEM AND METHOD FOR HANDLING ANONYMOUS BIOMETRIC AND/OR BEHAVIORAL DATA

CROSS REFERENCE TO RELATED APPLICATIONS

This application is a 35 U.S.C. § 371 National Phase Entry Application from PCT Application No. PCT/SE2019/050769, filed on Aug. 22, 2019, entitled "SYSTEM AND METHOD FOR HANDLING ANONYMOUS BIOMETRIC AND/OR BEHAVIOURAL DATA", and designating the U.S., which claims priority to Swedish Application No. 1851062-8, filed on Sep. 7, 2018, the disclosures of which are incorporated herein in their entireties by reference.

TECHNICAL FIELD

The invention generally relates to biometric systems and more specifically relates to systems and methods for handling and/or generating anonymous biometric and/or behavioural data, as well as a corresponding computer-program product, and a method for collecting aggregated statistics describing a population of subjects as a whole.

BACKGROUND

Public opinion as well as the development of privacy laws and video surveillance laws have highlighted the need to collect customer data without violating the subjects' right to privacy. New legislation is introduced that forbids biometric tracking of individuals without written consent. The storage of biometric and/or other identifiable data is usually forbidden.

Anonymous video surveillance has become widespread. Anonymous video surveillance allows the use of cameras and facial recognition technology for collecting rough demographic statistics such as the number of people, their gender and their age. Some systems also detect the facial direction, facial expressions and recognize the activities visible within the field of view. These systems capture momentary views, but are unable to study behaviours over time and study factors that influence human behaviour over longer time ranges.

Biometric systems detect and save specific biometric data of individuals. This saved data can be used to track trajectories of these individuals over longer periods of time and thus follow their reaction to previous exposure to states and events. Camera-based biometric systems are with ever increasing accuracy able to identify individuals, but their use is mostly limited to state actors that are less restricted in their need to respect privacy.

A key problem for other actors is how to track and study patterns of human behaviour over significant time lapses, possibly merging data from several biometric sensors, without violating the subjects' right to privacy.

The prior art may be represented by references [1-12].

SUMMARY

It is a general object to obtain behavioural data while preserving the actual, legal and/or perceived anonymity of these subjects.

It is a specific object to provide aggregated data on the time-dependent trajectories of individuals while preserving anonymity.

It is another object to provide aggregated data on the behavioural changes induced by stimuli applied to these subjects while preserving anonymity.

It is a specific object to provide a method and corresponding system for handling and/or generating anonymous biometric and/or behavioural data.

It is also an object to provide a corresponding computer-program product.

Still another object is to provide a method for collecting aggregated statistics describing a population of subjects as a whole.

These and other objects are met by embodiments as defined herein.

According to a first aspect, there is provided a system for handling and/or generating anonymous biometric and/or behavioural data. The system comprises a processing system, and the processing system is configured to receive biometric data originating from a subject and determine a biometric key based on the biometric data using a one-way locality-sensitive hashing for providing anonymity or receive the biometric key. The processing system is configured to create biometric trajectory data connecting anonymous behavioural data describing the user behavior of the subject to the biometric key. The processing system is further configured to store the biometric trajectory data associated with the biometric key into a corresponding biometric trajectory in a database wherein previous biometric trajectory data originating from the subject can be expected to exist. The processing system is also configured to anonymize biometric data from a multitude of individuals, or subjects, per key, where each biometric key maps to biometric data of several subjects, and such a set of subjects resulting in the same biometric key is called a hash group, and to develop a biometric trajectory for each hash group.

According to a second aspect, there is provided a method for handling anonymous behavioural data. The method comprises the steps of mapping biometric data originating from a subject into a biometric key using a one-way locality-sensitive hash function or receiving the biometric key. The method also comprises storing additional anonymous behavioural data bound to this key into an existing biometric trajectory in a database, wherein the behavioural data describes the user behavior of the subject. The method is performed to anonymize biometric data from a multitude of individuals, or subjects, per key, where each biometric key maps to biometric data of several subjects, and such a set of subjects resulting in the same biometric key is called a hash group, and a biometric trajectory is developed for each hash group.

According to a third aspect, there is provided a computer-program product comprising a non-transitory computer-readable medium on which a computer program is stored. The computer program comprises instructions, which when executed by a processor, cause the processor to:
receive biometric data originating from a subject; and
determine a biometric key based on the biometric data using a one-way locality-sensitive hashing for providing anonymity, or receive the biometric key;
create biometric trajectory data connecting anonymous behavioural data describing the user behavior of the subject to the biometric key; and
store the biometric trajectory data associated with the biometric key into a corresponding biometric trajectory in a database wherein previous biometric trajectory data originating from the subject can be expected to exist; and anonymize biometric data from a multitude of individuals, or subjects, per key, where each biometric key maps to biometric data of several subjects, and such a set of subjects resulting in the same biometric key is called a hash group, and develop a biometric trajectory for each hash group.

According to yet another aspect, there is provided a system for handling and/or generating anonymous biometric and/or behavioural data. The system comprises a processing system, wherein the processing system is configured to receive biometric data originating from a subject and determine a biometric key based on the biometric data using a one-way destructive locality-sensitive hashing with sufficiently high probability of collision between different subjects data for the hash to provide anonymity, or to receive said biometric key. The processing system is further configured to create biometric trajectory data connecting collected anonymous behavioural data to the biometric key, and configured to store the biometric trajectory data associated with the biometric key into a corresponding biometric trajectory in a database wherein previous biometric trajectory data with the same biometric key can be expected to exist and with a possibility of such data originating from both the subject and a multitude of other subjects in a way such that the specific previous data belonging to the subject cannot be identified.

By way of example, in this way it is thus possible to track and study patterns of human behavior over significant time lapses, possibly merging data from several biometric sensors, without violating the subjects' right to privacy.

According to another aspect, there is provided a method for collecting aggregated statistics describing a population of subjects as a whole. The method comprises the steps of mapping biometric data originating from a subject into a biometric key using a one-way locality-sensitive hash function, or receiving said biometric key; and storing anonymous behavioural data bound to this key into an existing biometric trajectory in a database, wherein the behavioural data describes the user behavior of the subject. The above steps are repeated for several of the population of subjects to distribute the subjects into hash groups, with a multitude of subjects per key, and developing a biometric trajectory for each of the hash group.

Other advantages offered by the invention will be appreciated when reading the below description of embodiments of the invention.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
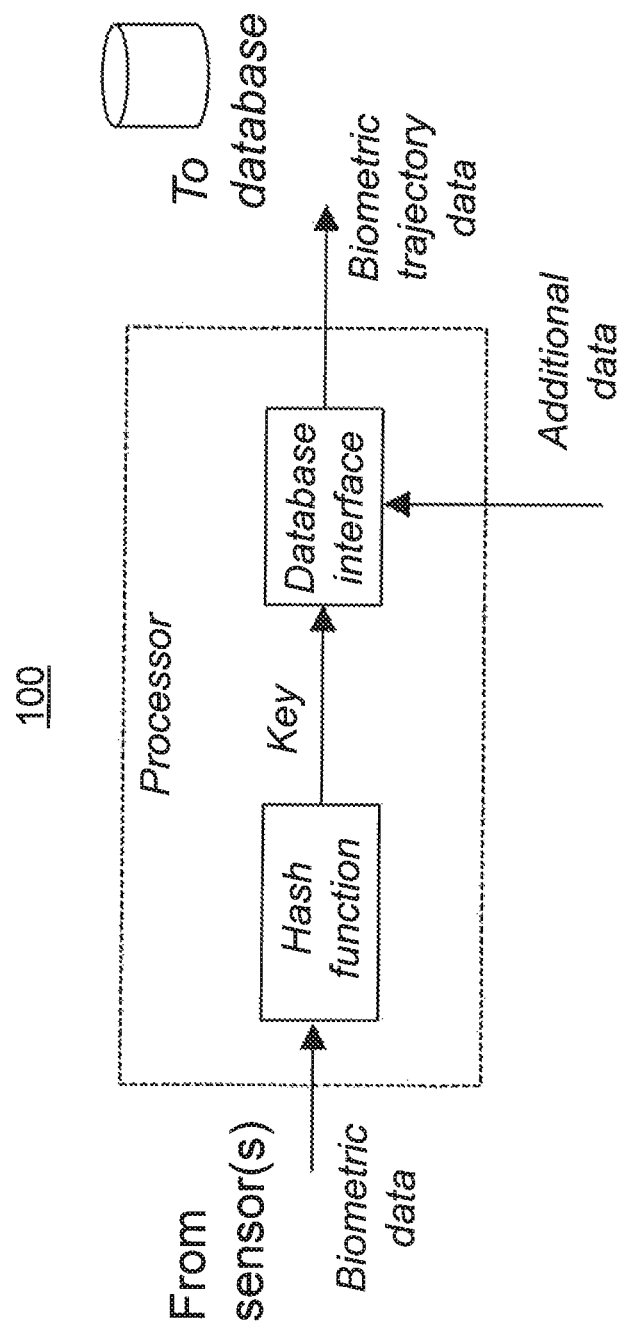
FIG. 1 is a schematic diagram illustrating key concepts involved in an embodiment of the system. There is provided a processing system programmed to receive biometric data. The processing system is programmed to apply a destructive locality-sensitive hash function to the biometric data and calculate a biometric key. The key is linked to some optional additional data and stored to database in a database interface.

For a better understanding of the proposed technology, it may be useful to begin with a brief system overview and/or analysis of the technical problem.

According to one aspect, there is provided a system capable of receiving subjects' biometric data. This data is sent to a processing system programmed to apply a destructive locality-sensitive, also referred to as location-sensitive, hash in order to yield an anonymous biometric key. Optionally it also contains a subsystem capable of providing a stimuli to the subject. The anonymous biometric key is linked with other data collected from the subject and stored in a database or other medium. A set of such anonymous data can then be processed with statistical methods to retrieve various statistics about the trajectories taken by subjects.

According to another aspect, there is provided a method for the collection of behavioural data from subjects. Data regarding the stimuli chosen is stored with a non-unique biometric key and the groups subsequent trajectories are tracked anonymously.

Other similar, complementary and/or alternative aspects of the proposed technology will now be described.

Anonymity refers to the difficulty of identifying the subject that some stored data relates to. We here assume that this identification can be performed either from stored data alone or by cross-referencing the data with other data sources. Methods that makes the identification process more burdensome and methods that reduce the probability of correct identification in practice are both considered to provide anonymity even if the theoretical possibility of an identification remains.

Perceived anonymity refers to any level of anonymity that is sufficient to affect the behavioural patterns of a person. In particular, this could refer to whether the level of anonymity is such as to reasonably be able to entice the purchase of an anonymizing product or a subject to approve recording of his/her data.

Legal anonymity is a level of anonymity that affects the legal status of a data collection, data storage, a data recording or a surveillance system. In particular, this could refer to the difference between data that is legally considered pseudo-anonymized or fully anonymized.

Actual anonymity is the objective achieved anonymity. Depending on the additional data sources and algorithms used, this might be unaffected by anonymization methods that provide legal and perceived anonymity. Likewise, a system that is perceived and legally treated as anonymized might not be objectively more secure from certain identification attempts.

Biometric data is any measurable physiological or behavioural characteristic of a person, such as iris patterns, height, estimated age, voice or gait. It particular, it can be the feature vector of a neural network trained to identify people according to biometric raw data, such as images.

Behavioural data is data describing a subjects' user behaviour. Examples of such data is user location, user action, speech, facial expression, displayed interest, gaze direction, movement pattern and choice preference.

'Biometric trajectory data' is any data linked to a biometric key. This link can be explicit, such as storing data and biometric key together in a data vector, and/or implicit, e.g. systems where the data is stored in a hash table based on a biometric key etc.

A 'biometric trajectory' is a set of biometric trajectory data linked together based in whole or in part on their biometric data. For examples of the latter, some embodiments of the invention utilizes one or several other data in addition to the biometric data, such as location, time, clothing and/or product preferences, in order to produce a more accurate identification. A biometric trajectory is anonymous if all contained biometric trajectory data is anonymous.

According to a specific application example, the invention solves the challenge of how to anonymously collect data on subjects' over time in such a way that we can produce a useful statistical understanding of the subjects' long-term behaviour. Such an analysis would benefit from statistically estimating factors that affect individual subjects' behaviour over time without storing identifiable information.

By way of example, in brief, the problem may be solved by linking data points collected at several different times together by using anonymized and non-unique biometric identity information. This degraded identification data can still be used to statistically aggregate the data points into meaningful and complex profiles describing behaviour over time. In other words, a persistent data collection systems can be set up to accumulate data tied to approximate identities, the hash keys, which can later be turned into general models of individual behaviour through an appropriate statistical analysis.

The invention allows on-going capturing of anonymous data and may instantaneously anonymize biometric data from a multitude of individuals, usually 50 or more, per hash key. This data may be continuously added to an anonymous biometric trajectory that tracks behavioural patterns over an extended period of time.

FIG. 1 is a schematic diagram illustrating key concepts involved in an embodiment of the system. We have a processing system programmed to receive biometric data. The processing system is programmed to apply a destructive locality-sensitive hash function to the biometric data and calculate a biometric key. They key is linked to some optional additional data and stored to database in a database interface.

In this example, the proposed system includes a processing system that is able to convert the biometric data into a biometric key. This processing takes place within a sufficiently short time delay such that the whole processing operation can be considered immediately for the purposes of perceived, legal and/or actual anonymization. In a typical embodiment the biometric data is received through an encrypted wireless network and securely stored in random access memory. The processing system applies a destructive locality-sensitive hash, LSH, and stores the hash key, after which the original biometric data is overwritten to prevent retrieval.

Optionally, the proposed system may include any number of sensor systems capable of recording biometric data. These are a large number of possible sensor systems, including but not limited to cameras, microphones, fingerprint sensors and microwave/laser imaging devices. The sensor systems includes any additional processing system that is required to process the raw sensor data into biometric data, e.g. facial recognition software and/or 3D spatial reconstruction systems.

Figure 2:
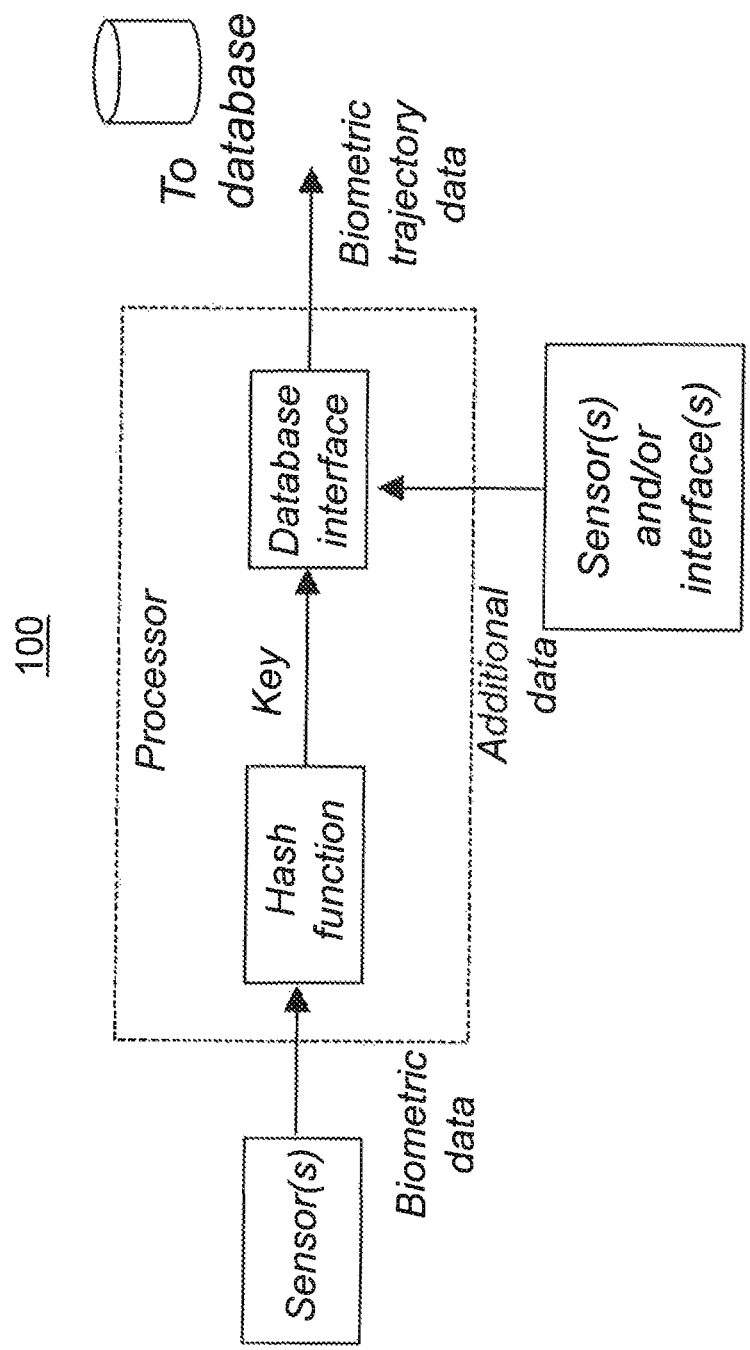
FIG. 2 is a schematic diagram illustrating additional key concepts involved in another embodiment. In this embodiment the system of FIG. 1 is extended by also including one or more sensors able to detect and/or send biometric data. Optional additional data is sent from one or more sensor(s) and/or database interfaces.

FIG. 2 is a schematic diagram illustrating additional key concepts involved in another embodiment. In this embodiment the system of FIG. 1 is extended by also including one or more sensors able to detect and/or send biometric data. Optional additional data is sent from one or more sensor(s) and/or database interfaces.

A biometric key may in some embodiments be calculated from a combination of biometric data and other readily available data, such as Wi-Fi MAC addresses, to get a more robust hash function.

A 'hash function' is any function that can be applied to a fixed-length input; or any function that can be applied to a variable-length input. Expressed slightly differently, a hash function is any function that can be used to map data of arbitrary size to data of a fixed size.

A 'locality-sensitive hash function', or 'LSH' for short, is a hash function that has a higher probability of mapping inputs that are close together in the input space to the same output.

A 'destructive hash function' or 'one-way function' herein is used in the general sense as any hash function that is non-injective in the space of the collected biometric values. In other words, the function destroys information in the input. Expressed differently, it is a one-way function that prevents retrieval of the precise input values from the output. We further limit the scope of our invention to such destructive hash functions to those that are able to provide actual, perceived and/or legal anonymity. The output of this function is called a biometric key. The set of people with faces that result in a certain biometric key is called a 'hash group'.

Expressed differently, the destructive/one-way hash function is a type of irreversible and true anonymization in contrast to using a reversible pseudo-anonymous identifier, where the input can be retrieved from the function output. Pseudo-anonymous identifiers can be reversed, for example by finding an identified individual's identifier by calculating an identifier from a known biometric measurement of the individual. A pseudo-anonymous identifier thus retains information that opens the possibility of identifying individuals in the dataset using additional data, while a destructive hash permanently destroys this information.

A 'destructive/one-way LSH' is any hash function that is both a destructive/one-way hash function and a locality-sensitive hash function.

The destructive/one-way LSH can be combined with noise added to: the input data; output data; and/or intermediate variables. Noise acts an additional method for masking the data. However, using noise for anonymization in this way reduces the likelihood of two close input data points being assigned to the same biometric key and thus tends to counteract the purpose of an LSH.

A simple example of a suitable destructive/one-way LSH is a two-step function:

In the first step it is possible to divide the space into hyperrectangles and destroy the information about within which hyperrectangle the input lies while preserving information about the location within the hyperrectangle. This can be done by a simple division by some divisor and by then discarding the integer part of the quotient along each axis of the input space. In the second step it is possible to apply another division of these hyperrectangles into smaller hyperrectangles. The identifier of the smaller hyperrectangle in which we find our input is our biometric key. This second step can be performed through division by some divisor along each axis, but we now retain only the integer part of the quotient and enumerate all possible coordinates. In this case, the number of the coordinate becomes the identifier.

Hashes of this type has several advantages. We remove large-scale patterns and implement a rough collision resistance for these in the input space with the division into larger hyperrectangles. The division into smaller hyperrectangles creates a simple locality-sensitive hashing, which increases the probability of any two noisy biometric measurements from the same subject being assigned to the same biometric key.

The resulting biometric key represents all biometric data within its boundaries. This location sensitivity ensures that the distribution of biometric measurements from a single subject has a high probability of receiving the same biometric key. Given 1 350 000 subjects, a three-dimensional biometric vector, and a divisor of 30, this anonymity would roughly correspond to k-anonymity with k=50 and thus be considered as anonymous in many contexts.

This above example is purely illustrative and equivalent or alternative hashing schemes can be realized by the skilled person.

In general terms the purpose of using a destructive hash is to generate groups of individuals according to a biometric criteria that is unrelated to and not significantly correlated with the actual attributes of interest to our population study. We are not interested in the differences between groups as such, but use re-identifiable and trackable groups in order to study the behaviour of the divided population as a whole. The purpose is to study the population using a subdivision into re-identifiable groups according to a criteria that is largely unrelated to the attributes actually being studied.

The purpose of the locality-sensitive property of the hash is to handle noise in the biometric measurements. While a cryptographic hash would effectively break any correlation between individuals in a group, which would in itself be a desirable property, it would also have an extremely low chance of reidentifying the individual since any small noise in the biometric measurement will result in completely different hash keys. Location-sensitivity, or locality-sensitivity, increases the chance for two noisy measurements from the same subject being assigned the same hash key and is what allows the invention in the present specific context to track behaviours over time.

In cases where the processing system is able to receive the result of a destructive LSH directly from a biometric data source, such as when calculated directly in the sensor, the extraction step can be skipped. The received result of the destructive LSH is then used as the biometric key in subsequent steps.

As previously indicated, the system may include a database capable of storing the biometric keys. This information can be stored explicitly and/or implicitly. The various forms of storage includes but are not limited to storage in the form of integers, floating point number and by location in hash tables. The database is also capable of storing any additional data linked to each biometric key, such as time, location, weather, gaze direction, state of the immediate environment, other biometric keys and/or facial expressions. A typical embodiment stores this information with an Application Programming Interface, API, to a cloud service that stays synchronized with a local backup of the information.

Ideally each biometric key maps to several subjects' biometric data, which in this case effectively anonymizes the data. However, with some small probability only a single subject might be assigned to a single hash group. In addition, other data can be correlated with stored data to identify subjects' data. Both these potential adversarial attempts to breach the anonymity require substantial additional external data sources such as knowledge of the destructive LSH, the subjects' location, photo and a large exhaustive photo database of subjects in a given area. They can be prevented entirely by carefully limiting the biometric data collection and by carefully designing biometrics and destructive hash functions such that they reliably produce sufficiently large hash groups.

The hash group can usually be considered a random subset of the whole set of subjects, which allows a wide range of statistical methods to be applied. In particular, variations across individuals can be estimated from the variations across groups if the subset selection is random. In other words, the invention allows to measure and perform statistics on subjects' behaviour over time while preserving perceived, legal and/or actual anonymity.

In one aspect of the invention the system also includes a system capable of providing a random stimuli provided to the subject that can reasonably be expected to alter their behaviour such that it alters future collected biometric trajectory data. Example of such systems able to provide stimuli include: digital screens; TV screens; audio equipment, lighting and other systems for visual stimuli, systems able to display text: systems able to provide instruction for staff regarding the treatment of the subject; olfactory systems, messages to be sent to subjects' electronic devices; and heating, ventilation and air conditioning systems. The lack of stimuli can also be considered a stimuli for a subset of the subjects when contrasted to the provision of such stimuli to other subjects.

The random selection of stimuli can be done in many ways, including but not limited to: randomly selected for each subject; randomly selected once for each biometric key; and/or with a distribution that is a function of the biometric key. The stimuli may also be chosen according to any distribution that is a function of one or several of: a random selection; the subject's biometric data; and/or any set of external factors, e.g. weather, location, previously shown stimuli and the behaviour of the subject.

For the aspect of our invention that explicitly includes a system able to provide a stimuli we specifically limit our invention to choices of stimuli based in whole or in part on the biometric key.

Figure 3:
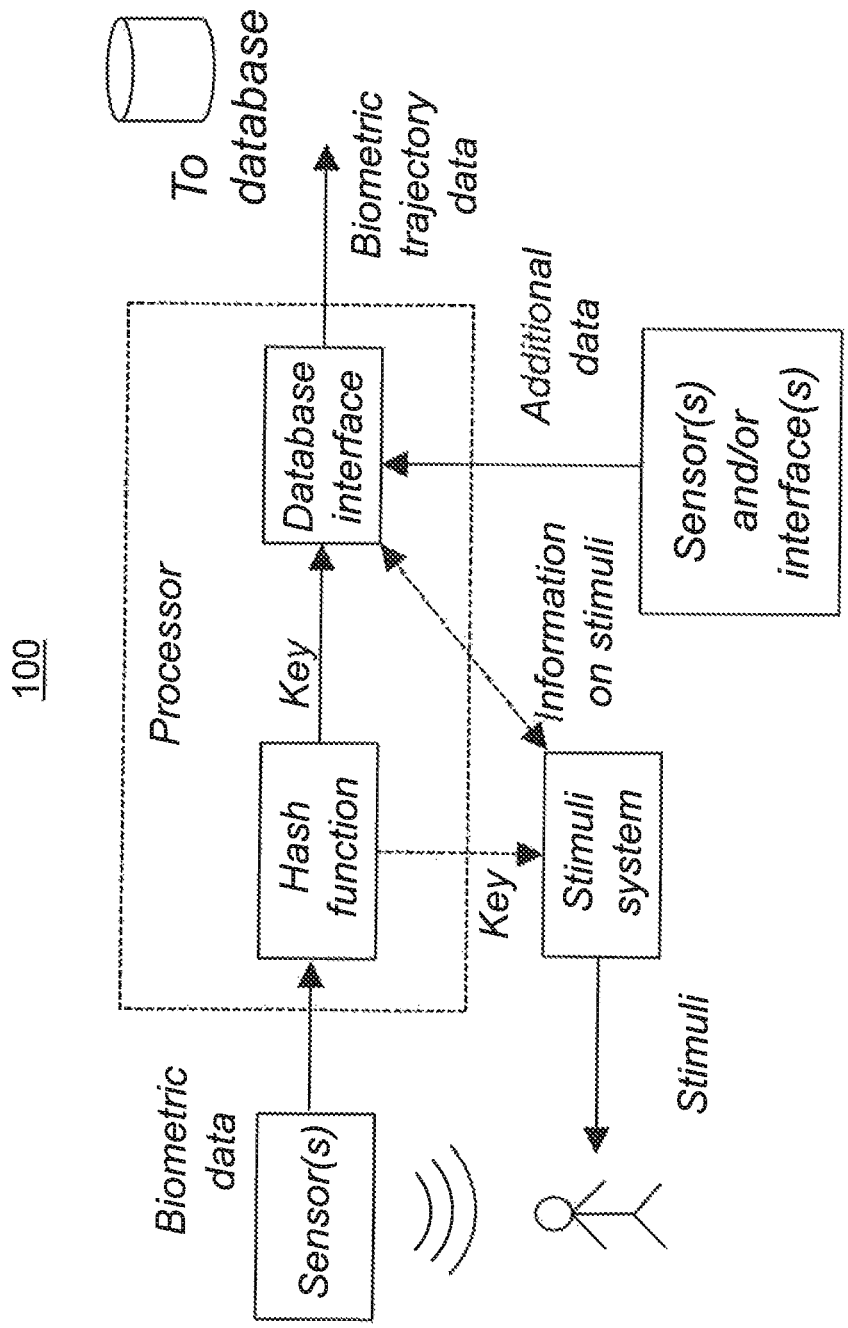
FIG. 3 is a schematic diagram illustrating additional key concepts involved. In this embodiment we extend the system of FIG. 2 by also including a system able to provide a stimuli. Information on which stimuli was applied can optionally be based on the biometric key. Information regarding the stimuli is synchronized between the database and the stimuli system, so that the database contains information regarding which stimuli has been applied.

FIG. 3 is a schematic diagram illustrating additional key concepts involved. In this embodiment we extend the system of FIG. 2 by also including a system able to provide a stimuli. Information on which stimuli was applied can optionally be based on the biometric key. Information regarding the stimuli is synchronized between the database and the stimuli system, so that the database contains information regarding which stimuli has been applied.

In this example, the system also performs statistical analysis of the biometric trajectories on the processing system. Statistical analysis of biometric trajectories can be done in a variety of ways. Each set of one or more hash groups can be assigned a specific stimuli and then the respective distributions in the biometric trajectory data can be compared. Alternatively, various degree of one or more stimuli can be applied, after which their effect can be approximated by a function such as a linear equation or neural network.

Several separate choices of stimuli, such as choice of marketing message and choice of music, can each be assigned to a set of hash groups according to a randomly generated mapping per choice of stimuli, which allows to study the effect of several choices of stimuli at a time. The subsequent analysis can in this case regard the stimuli as independently distributed variables.

Statistical analysis of hash groups can also be done without a stimuli. In this cases the distributions of various biometric trajectory data are compared against each other to identify correlations. For example, hash groups with a higher degree of subjects estimated to a certain age group could be correlated with a higher degree of visits to a pet store for those groups. Function approximation can be applied to continuous biometric trajectory data to identify trends, such as probability to enter a location before 10 AM as a function of probability to enter after 10 PM. Various population models, customer models and estimates of the distribution of individuals from their hash group statistics is also possible with additional mathematical assumptions. Many variations on statistical analysis of these types will be obvious to people having ordinary skill in the art.

In other words, the proposed technology may be represented by a system for handling and/or generating anonymous biometric and/or behavioural data. The system comprises a processing system, and the processing system may be configured to receive biometric data originating from a subject and determine a biometric key based on the biometric data using a one-way locality-sensitive hashing for providing anonymity, or receive the biometric key. Further, the processing system may be configured to create biometric trajectory data connecting anonymous behavioural data, describing the user behavior of the subject, to the biometric key. The processing system may be configured to store the biometric trajectory data associated with the biometric key into a corresponding biometric trajectory in a database wherein previous biometric trajectory data originating from the subject can be expected to exist. The processing system is also configured to anonymize biometric data from a multitude of individuals, or subjects, per key, where each biometric key maps to biometric data of several subjects, and such a set of subjects resulting in the same biometric key is called a hash group, and to develop a biometric trajectory for each hash group.

Optionally, the system further comprises a sensor system capable of capturing biometric data from the subject.

By way of example, the system may further comprise a system for providing a set of stimuli to the subject and where the applied stimulus is chosen as a function of the biometric key.

For example, the subject may be a customer and the stimuli may be a marketing message.

Optionally, the processing system may also be configured to conduct statistical analysis of the biometric trajectories for the purpose of estimating the effect of the stimuli.

By way of example, the processing system may be configured to conduct statistical analysis of hash groups.

For example, the processing system may be configured to compare distributions of biometric trajectory data against each other to identify correlations and/or apply function approximation to biometric trajectory data to identify trends and/or to create population models, customer models and estimates of the distribution of individuals from their hash group statistics.

Figure 4A:
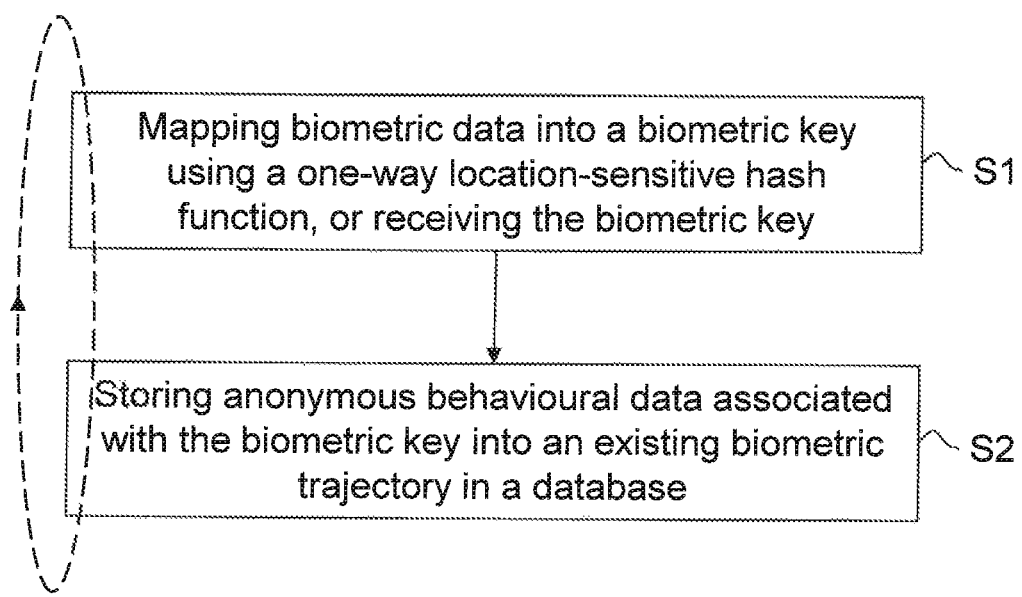
FIG. 4A is a schematic diagram illustrating an example of a method for handling anonymous behavioural data according to an embodiment.

FIG. 4A is a schematic diagram illustrating an example of a method for handling anonymous behavioural data according to an embodiment.

Basically, the method comprises the steps of:
mapping (S1) biometric data originating from a subject into a biometric key using a destructive locality-sensitive hash function, or receiving the biometric key; and
storing (S2) anonymous behavioural data bound to this key into an existing biometric trajectory in a database, wherein the behavioural data describes the user behavior of the subject.

The method is performed to anonymize biometric data from a multitude of individuals, or subjects, per key, where each biometric key maps to biometric data of several subjects, and such a set of subjects resulting in the same biometric key is called a hash group, and a biometric trajectory is developed for each hash group.

In a sense, the steps S1-S2 may thus be repeated (see the dashed loop in FIG. 4A) for a population of subjects to distribute the subjects into hash groups, with a multitude of subjects per key, and developing a biometric trajectory for each of the hash groups.

In other words, according to another aspect, there is provided a method for collecting aggregated statistics describing a population of subjects as a whole. The method comprises the steps of mapping biometric data originating from a subject into a biometric key using a one-way locality-sensitive hash function, or receiving said biometric key; and storing anonymous behavioural data bound to this key into an existing biometric trajectory in a database, wherein the behavioural data describes the user behavior of the subject. The above steps are repeated for several of the population of subjects to distribute the subjects into hash groups, with a multitude of subjects per key, and developing a biometric trajectory for each of the hash group. The proposed technology also provides a corresponding system.

Figure 9:
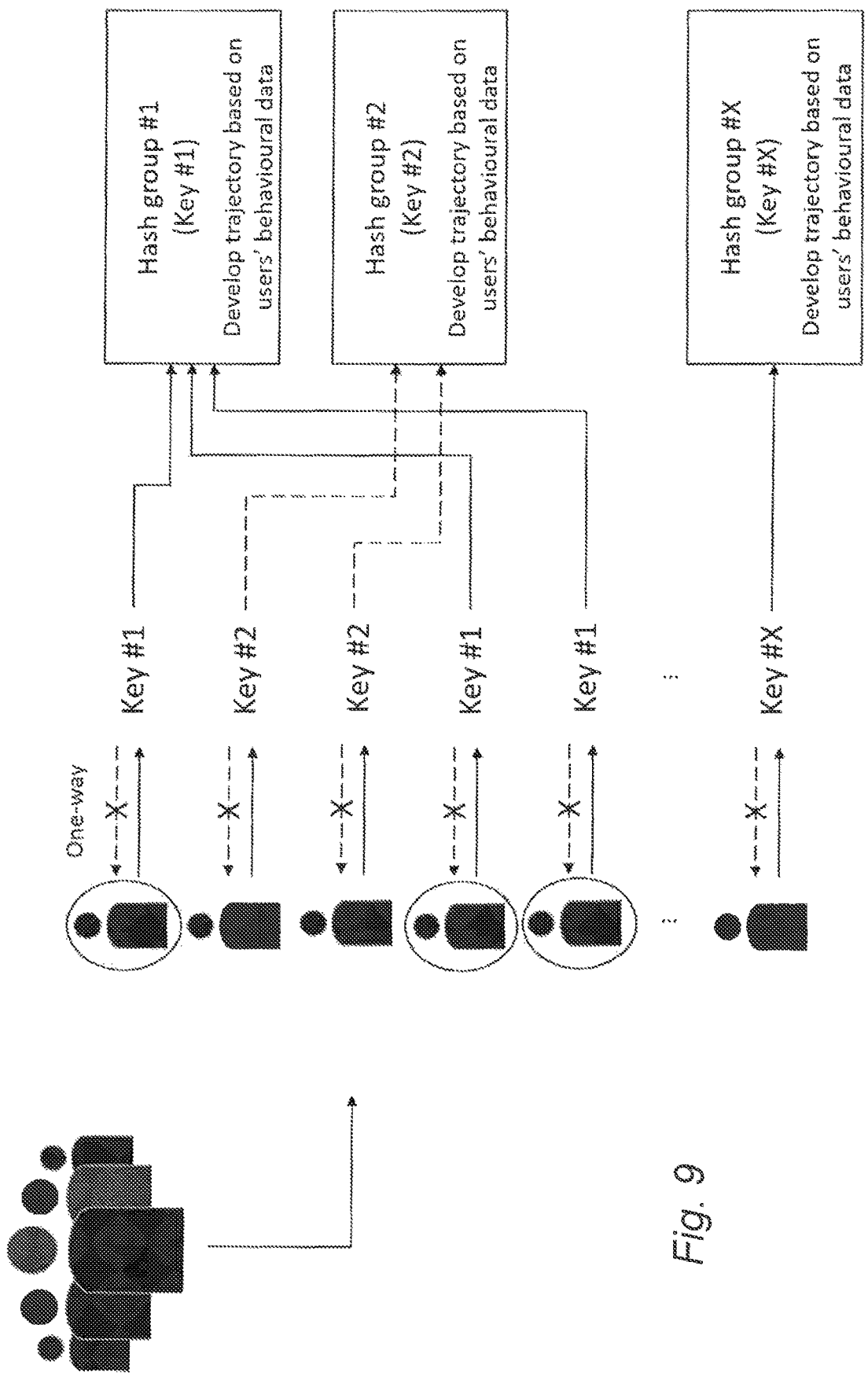
FIG. 9 is a schematic diagram illustrating an example of how a population of subjects can anonymously be divided into hash groups.

FIG. 9 is a schematic diagram illustrating an example of how a population of subjects can anonymously be divided into hash groups.

For example, with reference to FIG. 9, it can be seen that the biometric data of each subject in a given population group can be mapped to a biometric key, i.e. a hash key. For each subject, it is possible to create biometric trajectory data connecting anonymous behavioural data describing user behavior to the corresponding biometric key, and store the biometric trajectory data associated with the biometric key into a corresponding biometric trajectory in a database. Importantly, subjects associated with the same key can be regarded as a hash group (such as the encircled subjects that are all linked to hash group #1), and a "common" biometric trajectory is thereby developed for each hash group.

In addition, locality-sensitive hashing also increases the probability of any two noisy biometric measurements from the same subject being assigned to the same biometric key.

The proposed technology allows on-going capturing of anonymous data and may anonymize biometric data from a multitude of individuals, or subjects, per hash key. This data may be continuously added to a corresponding anonymous biometric trajectory that tracks behavioural patterns over an extended period of time.

In practice, this means that previous biometric trajectory data for any given biometric key can be expected to exist and with a possibility of such data originating from both a particular subject and a multitude of other subjects in a way such that the specific data belonging to the currently processed subject cannot be identified.

This approach allows the biometric trajectory of each hash group to be analyzed and compared to other groups, e.g. for statistical purposes, without storing identifiable information that can be traced back to any individual user.

According to a specific application example, the invention solves the challenge of how to anonymously collect data on subjects' over time in such a way that we are enabled to produce a useful statistical understanding of the subjects' long-term behaviour.

By way of example, in brief, the problem may be solved by linking data points collected at several different times by using anonymized and non-unique biometric identity information. This degraded identification can still be used to statistically aggregate the data points into meaningful and complex profiles describing behaviour over time. In other words, a persistent data collection systems can be set up to accumulate data tied to "approximate identities", the hash keys, which if desired can later be turned into general models of individual behaviour through an appropriate statistical analysis.

In other words, the invention enables measurements and statistics on subjects' behaviour over time while preserving perceived, legal and/or actual anonymity.

In practice, this means that previous biometric trajectory data for any given biometric key can be expected to exist and with a possibility of such data originating from both a particular subject and a multitude of other subjects in such a way that the specific data belonging to the currently processed subject cannot be identified. This approach according to the present invention allows the biometric trajectory of each hash group to be analyzed and compared to other groups, without storing identifiable information that can be traced back to any individual user. This effectively means that the biometric key is not a unique identifier per individual, but rather for an entire group (i.e. a hash group) of several individuals, effectively and truly anonymizing any personal data.

Figure 4B:
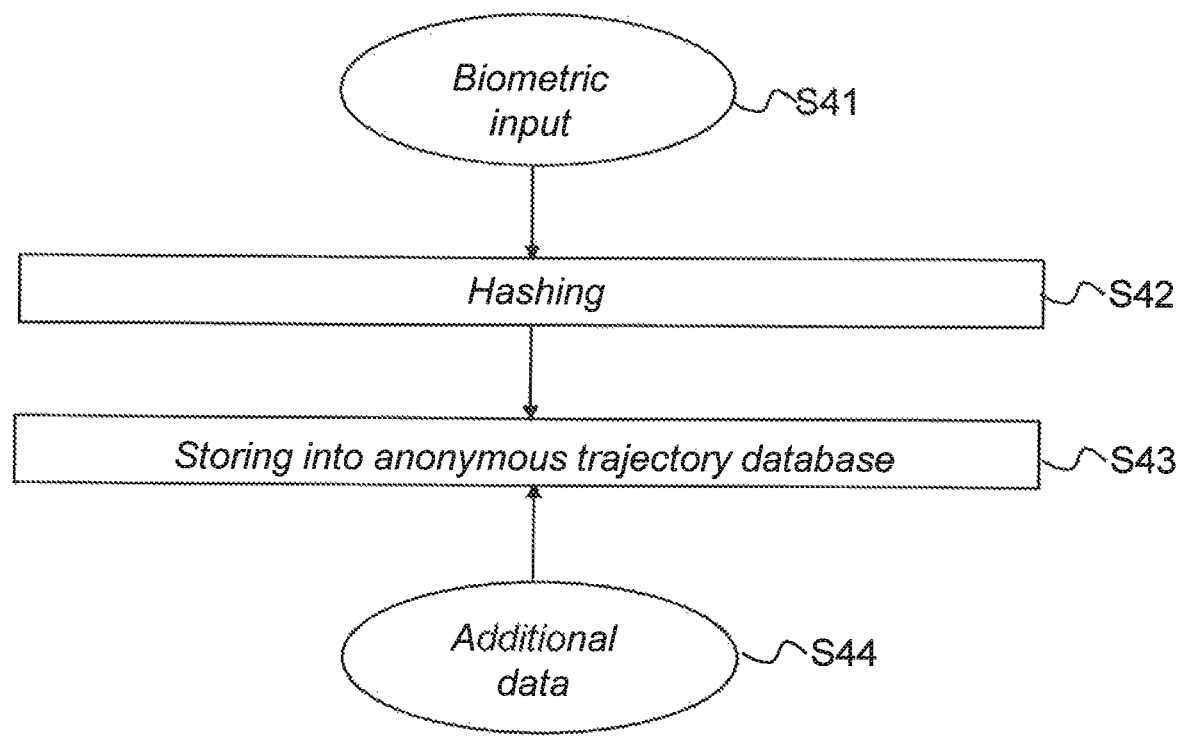
FIG. 4B is a schematic diagram illustrating examples of key concepts involved in the method.

FIG. 4B is a schematic diagram illustrating examples of key concepts involved in the method. In the first step, a biometric input is received (S41) and it is processed (S42) into a biometric key using a locality-sensitive hash function. The biometric key is linked to additional data (S44) and stored in a database (S43).

Figure 5:
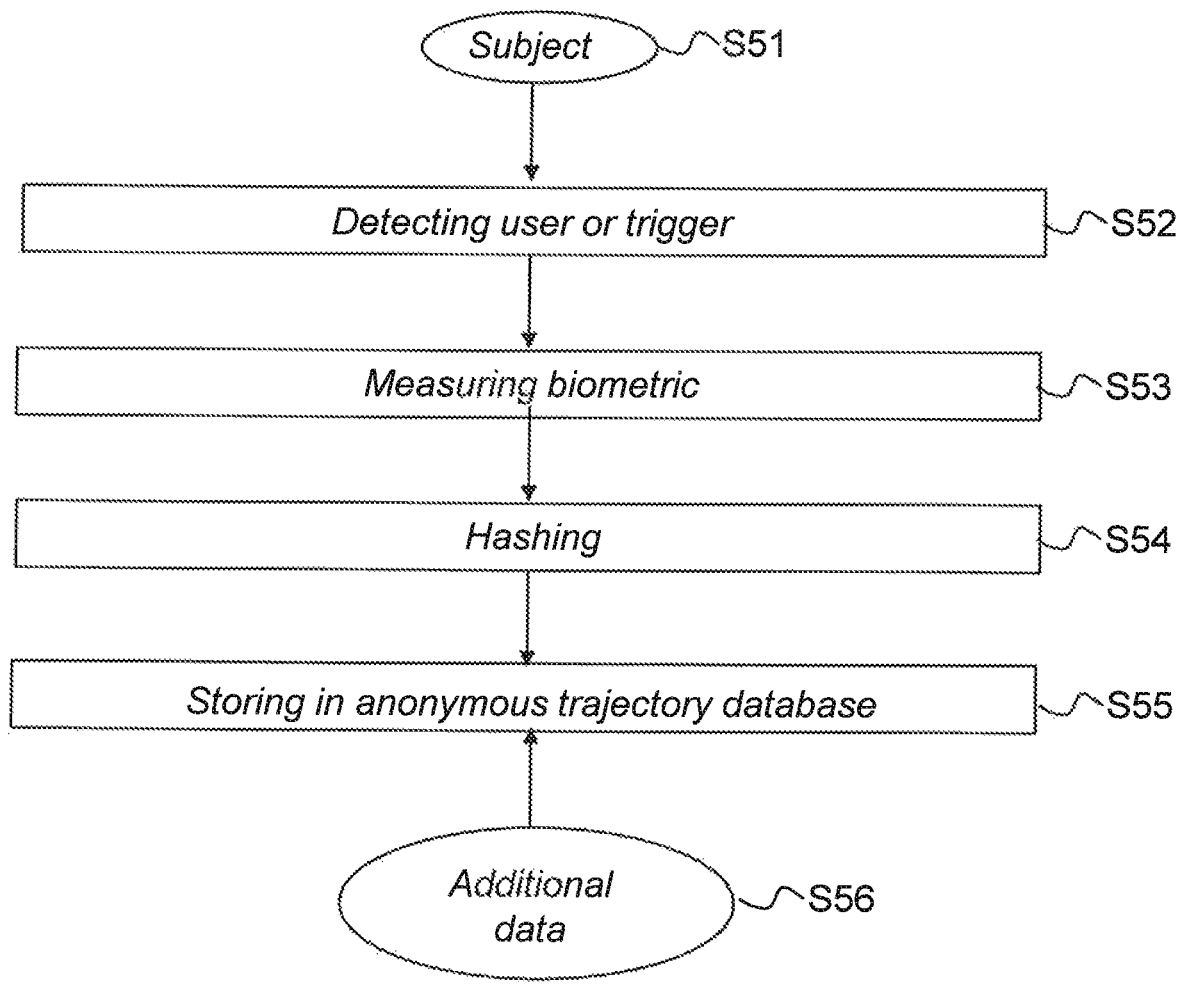
FIG. 5 is a schematic diagram illustrating examples of additional optional concepts in another embodiment of the invention.

FIG. 5 is a schematic diagram illustrating examples of additional optional concepts in another embodiment of the invention. In this specific embodiment all the key steps of FIG. 4B are included in addition to the following steps: detection (S52) of a user or trigger, and measuring and/or capturing (S53) of the biometric data of a subject and/or detecting the biometric data in a data stream.

In other words, the method may further comprise the steps of:
  detecting a subject in a continuous data stream; and
  measuring the biometric data of the subject when the subject is detected.

Optionally, the method further comprises the step of choosing a stimulus to be shown to the subject based on the biometric key.

Figure 6:
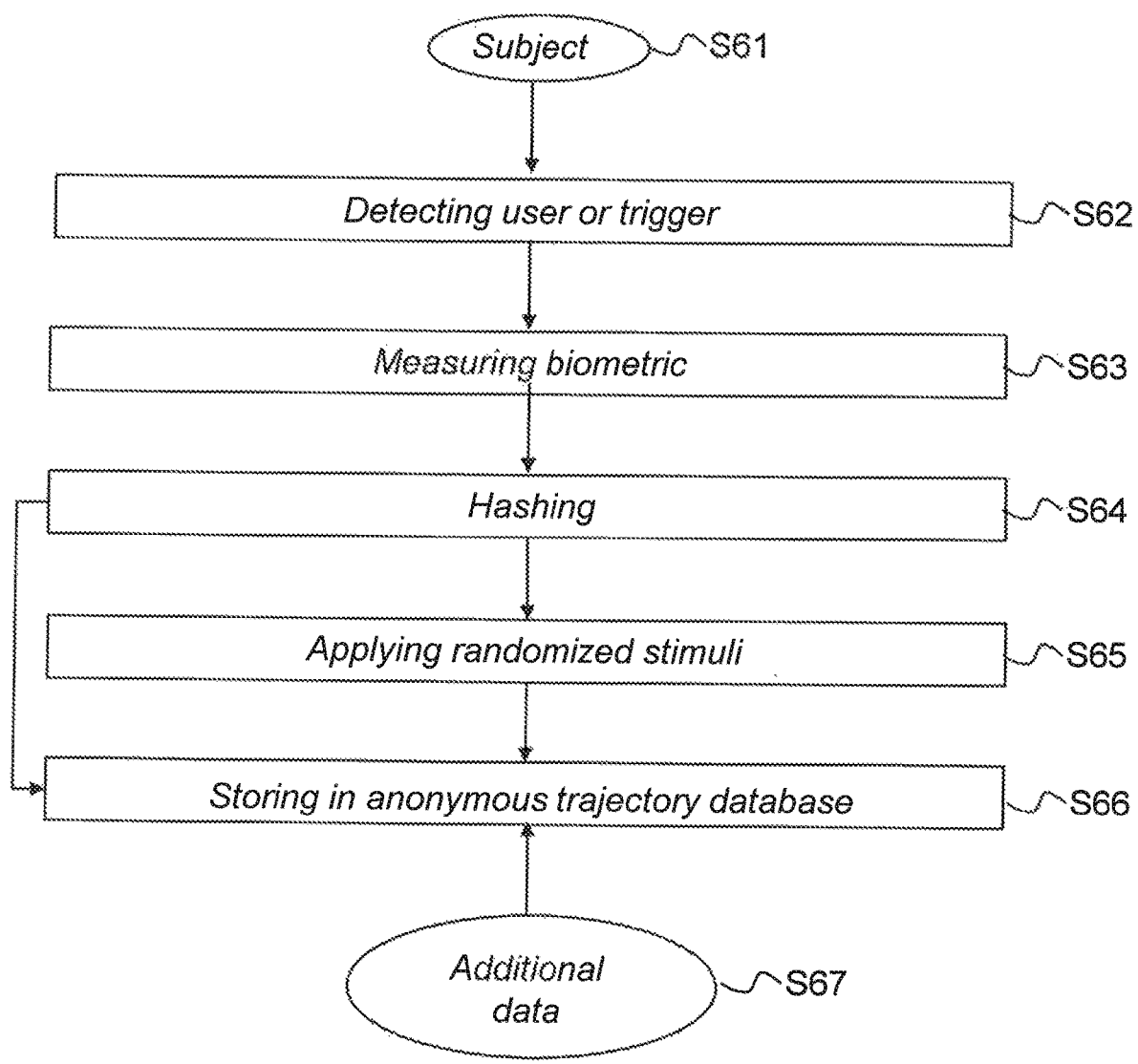
FIG. 6 is a schematic diagram illustrating examples of additional optional concepts in another embodiment of the invention.

FIG. 6 is a schematic diagram illustrating examples of additional optional concepts in another embodiment of the invention. This embodiment is similar to that illustrated in FIG. 5, but adds a random stimuli. This embodiment may also provide the subject with a stimuli chosen randomly (S65). Direct or indirect information regarding the stimuli provided is recorded together with the subjects' biometric data (S66). The use of biometric key in selecting the stimuli is optional. An alternative is to select the stimuli randomly. Both approaches would allow a later statistical analysis to anonymously deduce the effect on subjects' behaviour from various stimuli.

By way of example, the subject may be a customer and the stimuli may be a marketing message.

It is also possible for the method to further comprise the step of repeating previous steps a plurality of times and performing statistical analysis on the trajectory data, as previously discussed.

By way of example, the method may thus optionally include conducting statistical analysis of hash groups.

For example, statistical analysis may be conducted to compare distributions of biometric trajectory data against each other to identify correlations and/or apply function approximation to biometric trajectory data to identify trends and/or to create population models, customer models and estimates of the distribution of individuals from their hash group statistics.

According to yet another aspect, there is provided a system for handling and/or generating anonymous biometric and/or behavioural data. The system comprises a processing system, wherein the processing system is configured to receive biometric data originating from a subject and determine a biometric key based on the biometric data using a one-way destructive locality-sensitive hashing with sufficiently high probability of collision between different subjects data for the hash to provide anonymity, or to receive said biometric key. The processing system is further configured to create biometric trajectory data connecting collected anonymous behavioural data to the biometric key, and configured to store the biometric trajectory data associated with the biometric key into a corresponding biometric trajectory in a database wherein previous biometric trajectory data with the same biometric key can be expected to exist and with a possibility of such data originating from both the subject and a multitude of other subjects in a way such that the specific previous data belonging to the subject cannot be identified.

Figure 7:
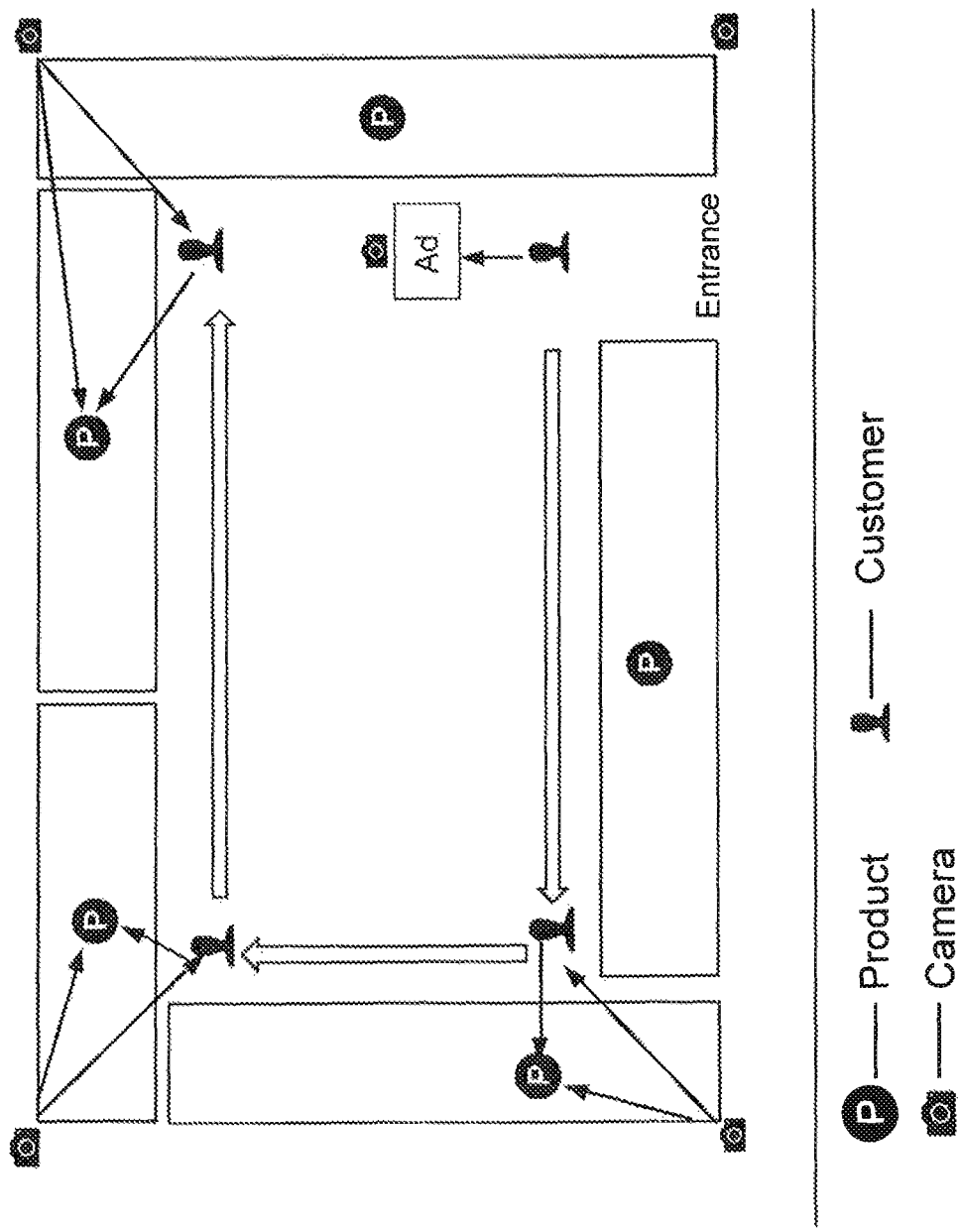
FIG. 7 is a schematic diagram illustrating an example of how the invention could be applied in a retail setting.

FIG. 7 is a schematic diagram illustrating an example of how the invention could be applied in a retail setting. The subject walks in through the entrance. The camera detects the subject(s), captures the biometric data from the subject(s) and calculates a biometric key per subject. A pseudorandom mapping is used to select one of two marketing videos based on this key for display on the screen to the subject(s). Afterwards all cameras detect the subject(s), identify which products the subject(s) look(s) at and stores this data together with the subjects' biometric key. After collecting data from several subjects we can detect the correlation between the displayed marketing video and the resulting interest shown for various products.

In a first illustrative example of a use case of an embodiment of the invention, a retail store would like to anonymously collect data on how customers react to different marketing messages. Store cameras capture the faces of visiting customers and convert the facial image into a biometric key. The biometric key is stored together with the day, the location, and the marketing message displayed in the store at the time of the visit.

During the next visits of the same customer to the store the face is each time converted into the same biometric key.

Over several visits, a trajectory is developed for each hash group that can be used to show a variety of statistics, such as the number of visits and what areas of the store that are visited.

Over time many such trajectories are anonymously collected over large numbers of individuals visiting the store. The effect of each marketing message can then be statistically estimated by comparing hash groups. The store can use this data to directly estimate how many consequent visits a certain message results in on average.

In a second illustrative example of a use case, a company seeks to estimate how work load correlates with employee mood changes. Cameras are set up in the work environment and anonymous biometric facial data is recorded. The cameras also estimate the mood of the employee using standard facial recognition techniques. The employee calendar and photo is used to store calendar data in corresponding hash groups. Correlations between calendar data and subsequent changes in mood can then be established and compared between hash groups. To further isolate causal relationship the company can then study the hash groups by introducing a random change to the work schedule for each biometric key.

It will be appreciated that the methods and devices described above can be combined and re-arranged in a variety of ways, and that the methods can be performed by one or more suitably programmed or configured digital signal processors and other known electronic circuits (e.g. discrete logic gates interconnected to perform a specialized function, or application-specific integrated circuits).

Many aspects of this invention are described in terms of sequences of actions that can be performed by, for example, elements of a programmable computer system.

The steps, functions, procedures and/or blocks described above may be implemented in hardware using any conventional technology, such as discrete circuit or integrated circuit technology, including both general-purpose electronic circuitry and application-specific circuitry.

Alternatively, at least some of the steps, functions, procedures and/or blocks described above may be implemented in software for execution by a suitable computer or processing device such as a microprocessor, Digital Signal Processor (DSP) and/or any suitable programmable logic device such as a Field Programmable Gate Array (FPGA) device and a Programmable Logic Controller (PLC) device.

It should also be understood that it may be possible to re-use the general processing capabilities of any device in which the invention is implemented. It may also be possible to re-use existing software, e.g. by reprogramming of the existing software or by adding new software components.

It is also possible to provide a solution based on a combination of hardware and software. The actual hardware-software partitioning can be decided by a system designer based on a number of factors including processing speed, cost of implementation and other requirements.

The term 'random' should be interpreted in a general sense as the use of any selection from a set that is chosen to be statistically equivalent to a random number. This includes pseudorandom numbers and external sources of natural noise, regardless of whether these are found to be fundamentally deterministic or stochastic.

Figure 8:
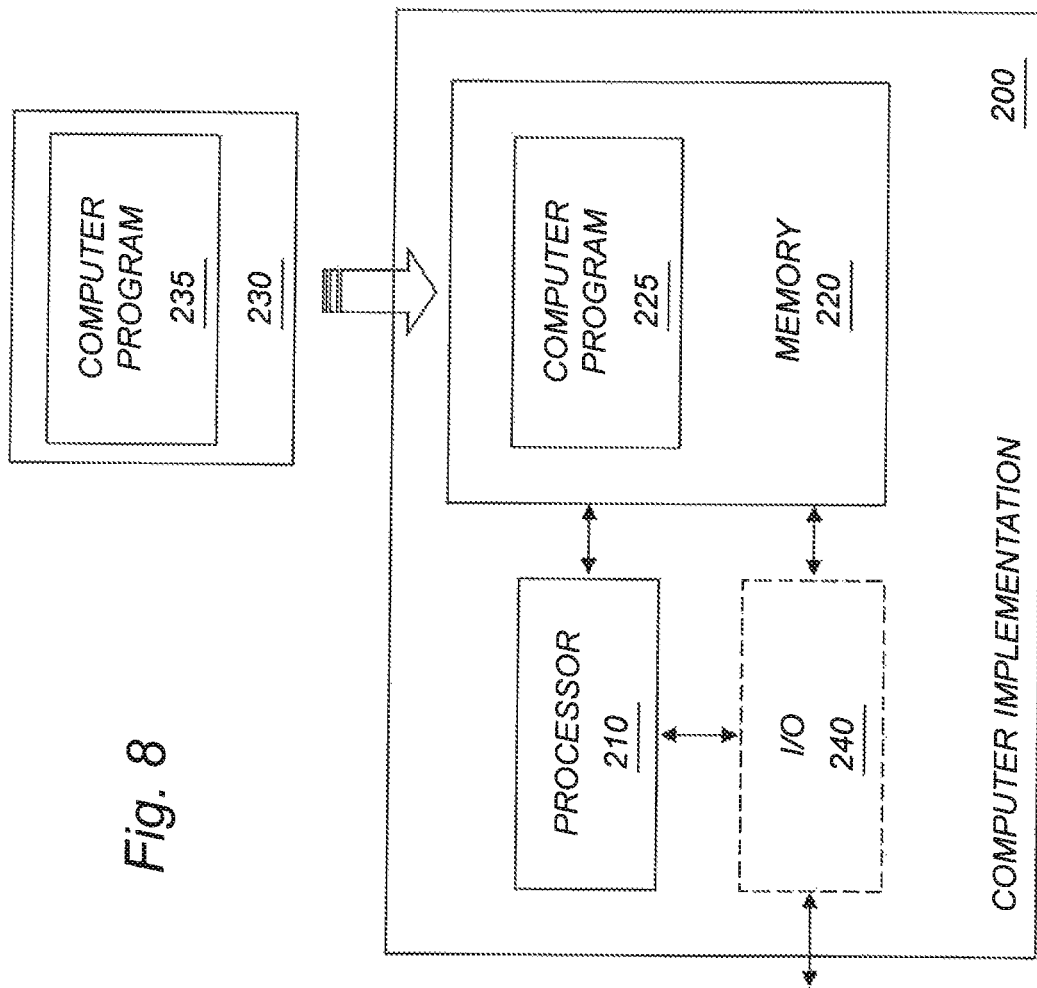
FIG. 8 is a schematic diagram illustrating an example of a computer implementation according to an embodiment.

FIG. 8 is a schematic diagram illustrating an example of a computer implementation according to an embodiment. In this particular example, the system 200 comprises a processor 210 and a memory 220, the memory comprising instructions executable by the processor, whereby the processor is operative to perform the steps and/or actions described herein. The instructions are typically organized as a computer program 225; 235, which may be preconfigured in the memory 220 or downloaded from an external memory device 230. Optionally, the system 200 comprises an input/output interface 240 that may be interconnected to the processor(s) 210 and/or the memory 220 to enable input and/or output of relevant data such as input parameter(s) and/or resulting output parameter(s).

The term 'processing system' should be interpreted in a general sense as any system or device capable of executing program code or computer program instructions to perform a particular processing, determining or computing task. It also includes distributed computing as well as analogue computing devices that are able to perform equivalent computations without a computer program.

According to yet another aspect, there is provided a computer-program product comprising a non-transitory computer-readable medium on which a computer program is stored. The computer program comprises instructions, which when executed by a processor, cause the processor to:
- receive biometric data originating from a subject; and
- determine a biometric key based on the biometric data using a one-way locality-sensitive hashing for providing anonymity, or receive the biometric key;
- create biometric trajectory data connecting anonymous behavioural data describing the user behavior of the subject to the biometric key; and
- store the biometric trajectory data associated with the biometric key into a corresponding biometric trajectory in a database wherein previous biometric trajectory data originating from the subject can be expected to exist; and
- anonymize biometric data from a multitude of individuals, or subjects, per key, where each biometric key maps to biometric data of several subjects, and such a set of subjects resulting in the same biometric key is called a hash group, and develop a biometric trajectory for each hash group.

The processor or equivalent processing system does not have to be dedicated to only execute the above-described steps, functions, procedure and/or blocks, but may also execute other tasks.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions.

The software may be realized as a computer program product, which is normally carried on a non-transitory computer-readable medium, for example a CD, DVD, USB memory, hard drive or any other conventional memory device. The software may thus be loaded into the operating memory of a computer or equivalent processing system for execution by a processor. The computer/processor does not have to be dedicated to only execute the above-described steps, functions, procedure and/or blocks, but may also execute other software tasks.

The flow diagram or diagrams presented herein may be regarded as a computer flow diagram or diagrams, when performed by a processing system. A corresponding apparatus may be defined as a group of function modules, where each step performed by the processing system corresponds to a function module. In this case, the function modules are implemented as one or more computer programs running on the processing system.

The computer programs residing in memory may thus be organized as appropriate function modules configured to perform, when executed by the processing system, at least part of the steps and/or tasks described herein.

Alternatively it is possible to realize the module(s) predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services. The functionality can also be a local processor systems with parts of the functionality replaced with interfaces to equivalent functionality on remote computing services.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

REFERENCES

[1] U.S. Pat. No. 9,031,858B2
[2] U.S. Pat. No. 9,031,857B2
[3] U.S. Pat. No. 9,020,208B2
[4] U.S. Pat. No. 9,092,808B2
[5] U.S. Pat. No. 9,361,623B2
[6] U.S. Pat. No. 9,894,063B2
[7] US 201310195316A1
[8] US 2014/0122248A1
[9] US 2015/0006243A1
[10] US 2016/0371547A1
[11] US 2014/0063237A1
[12] EP 2,725,538

The invention claimed is:

1. A system for handling and/or generating anonymous biometric and/or behavioural data to enable studying of a population of subjects or individuals based on one or more attributes being studied, said system comprising a processing system, wherein the processing system is configured to receive biometric data, originating from a subject or individual, representing personal and identifiable information capable of identifying the individual, and determine a biometric key based on the biometric data using a one-way locality-sensitive hashing for anonymizing the biometric data and thereby providing anonymity;

wherein the processing system is configured to create biometric trajectory data connecting anonymous behavioural data describing a user behavior of the subject to the biometric key;

wherein the processing system is configured to store the biometric trajectory data associated with the biometric key into a corresponding biometric trajectory in a database wherein previous biometric trajectory data originating from the subject exist; and wherein the processing system is configured to anonymize biometric data from a multitude of individuals, or subjects, per key, where each biometric key maps to biometric data of several subjects, and such a set of subjects resulting in the same biometric key is called a hash group, and to develop a biometric trajectory for each hash group to thereby distribute a plurality of subjects of the population into hash groups, effectively dividing the population into re-identifiable and trackable groups, with a multitude of subjects per key, wherein the processing system is configured to develop a biometric trajectory for each of the hash groups, allowing the biometric trajectory of each hash group to be analyzed and compared to other groups, without storing personal, identifiable information that can be traced back to any individual, and wherein the processing system is configured to use the re-identifiable and trackable groups in order to study a behaviour of the population as a whole, wherein the groups are generated according to a biometric criteria that is unrelated to said one or more attributes being studied.

2. The system according to claim 1, further comprising a sensor system capable of capturing biometric data from the subject.

3. The system according to claim 1, further comprising a system for providing a set of stimuli to the subject and where an applied stimulus is chosen as a function of the biometric key.

4. The system according to claim 3, wherein the subject is a customer and one or more of the set of stimuli are marketing messages.

5. The system according to claim 3, wherein the processing system is also configured to conduct statistical analysis of the biometric trajectories for the purpose of estimating an effect of the set of stimuli.

6. The system according to claim 1, wherein the processing system is configured to conduct statistical analysis of hash groups.

7. The system according to claim 6, wherein the processing system is configured to compare distributions of biometric trajectory data against each other to identify correlations and/or apply function approximation to biometric trajectory data to identify trends and/or to create population models, customer models and estimates of the distribution of individuals from their hash group statistics.

8. A method for handling and/or generating anonymous biometric and/or behavioural data to enable studying of a population of subjects or individuals based on one or more attributes being studied, said method comprising the steps of:

mapping biometric data originating from a subject or individual, representing personal and identifiable information capable of identifying the individual, into a biometric key using a one-way locality-sensitive hash function for anonymizing the biometric data and thereby providing anonymity; and storing anonymous behavioural data bound to this key into an existing biometric trajectory in a database, wherein the behavioural data describes a user behavior of the subject, wherein the method is performed to anonymize biometric data from a multitude of individuals, or subjects, per key, where each biometric key maps to biometric data of several subjects, and such a set of subjects resulting in the same biometric key is called a hash group, and wherein a biometric trajectory is developed for each hash group to thereby distribute a plurality of subjects into hash groups, effectively dividing the population into re-identifiable and trackable groups, with a multitude of subjects per key, and developing a biometric trajectory for each of the hash groups, allowing the biometric trajectory of each hash group to be analyzed and compared to other groups, without storing personal, identifiable information that can be traced back to any individual, and using the re-identifiable and trackable groups in order to study a behaviour of the population as a whole, wherein the groups are generated according to a biometric criteria that is unrelated to said one or more attributes being studied.

9. The method according to claim 8, further comprising the steps of:
detecting a subject in a continuous data stream; and
measuring the biometric data of the subject when the subject is detected.

10. The method according to claim 9, further comprising the step of choosing a stimulus to be shown to the subject based on the biometric key.

11. The method according to claim 10, further comprising the step of repeating previous steps a plurality of times and performing statistical analysis on the trajectory data.

12. The method according to claim 10, wherein the subject is a customer and the stimulus is a marketing message.

13. The method of claim 8, wherein the method further comprises conducting statistical analysis of hash groups.

14. The method of claim 13, wherein statistical analysis is conducted to compare distributions of biometric trajectory data against each other to identify correlations and/or apply function approximation to biometric trajectory data to identify trends and/or to create population models, customer models and estimates of the distribution of individuals from their hash group statistics.

* * * * *